United States Patent [19]

Tamura

[11] 3,852,435

[45] Dec. 3, 1974

[54] URIDINE-5'-DIPHOSPHATE-GLUCURONIC ACID COMPOSITIONS

[75] Inventor: Shunkichi Tamura, Funabashi, Japan

[73] Assignee: Yamasa Shoyu Kabushiki Kaisha

[22] Filed: Oct. 30, 1972

[21] Appl. No.: 301,728

[52] U.S. Cl. ............................................... 424/180
[51] Int. Cl. ........................... A01n 9/00, A01n 9/28
[58] Field of Search ..................................... 424/180

[56] References Cited
OTHER PUBLICATIONS

Chemical Abstracts (1966), Vol. 65, Pars. 14.213(b) relied on.

Primary Examiner—Elbert L. Roberts
Attorney, Agent, or Firm—Wenderoth, Lind & Ponack

[57] ABSTRACT

Pharmaceutical compositions characterized by accelerating action for glucuronide formation comprising uridine-5'-diphosphate-glucuronic acid or its pharmaceutically acceptable salt in admixture with pharmaceutical carriers.

8 Claims, No Drawings

URIDINE-5'-DIPHOSPHATE-GLUCURONIC ACID COMPOSITIONS

The present invention relates to pharmaceutical compositions comprising uridine-5'-diphosphate-glucuronic acid or its pharmaceutically acceptable salt having accelarating action for glucuronide formation and to methods for using the same.

Uridine-5'-diphosphate-glucuronic acid is known to play as a glycuronyl donor in the glucuronide formation which is a most typical one of detoxication mechanisms in a living body. However, its uses as a pharmaceutical agent has not been investigated.

According to the present invention, it has been found that uridine-5'-diphosphate-glucuronic acid is a potent accelerator for the glucuronide formation.

Hitherto, sulfur-containing amino acids and peptides, such as methionine, cysteine and glutathione, have been used clinically as biochemical antidotes. These compounds are known to participate in detoxication by accelerating oxidation-reduction reaction and amino acid conjugation in vivo. However, these reactions are not primary in detoxication.

On the other hand, according to the present invention, uridine-5'-diphosphate-glucuronic acid has been found to be a potent accelerator for the glucuronide conjugation which is a most important reaction in detoxication in living body. Accordingly, uridine-5'-diphosphate-glucuronic acid can be considered to be a novel biochemical antidote different from the known biochemical antidotes such as methionine, cysteine and glutathione in point of the drug action.

Thus, the administration of uridine-5'-diphosphate-glucuronic acid is to be an effective method of treating not only detoxication disturbances, in which it is desired to obtain an increase in the glucuronide forming ability such as liver-failure, but also various metabolic diseases which are caused by a decrease in the glucuronide forming ability such as icterus-neonatorum, Gilbert's disease.

It is therefore the primary object of the present invention to provide a pharmaceutical composition having accelerating action for glucuronide formation which contain, as an active ingredient, uridine-5'-diphosphate-glucuronic acid or its pharmaceutically acceptable salts, in admixture with a pharmaceutical carrier.

The foregoing object as well as efficaciousness of the present invention will become more apparent from the following detailed description thereof.

The carrier can be either solid pharmaceutical carrier or diluent when intended for oral administration or as a suppository, or sterile injectable liquid pharmaceutical carrier or diluent when intended for parenteral administration, or liquid pharmaceutical carrier or diluent possibly in admixture with sweetening and/or flavoring agent when intended for oral administration.

The phamaceutical composition according to the present invention can be utilized in any of the dosage forms conventionally used for oral or parenteral administration.

As the dosage form suitable for oral administration, powder, tablets, pills, capsules and dragees may be mentioned as examples.

The composition may be associated with the conventional carrier or diluent such as lactose, starch, calcium phosphate, talc, magnesium stearate, polyvinyl pyrrolidone, carboxymethyl cellulose and gelatine.

The liquid composition for oral administration may preferably be used in the form of syrup, emulsion or suspension, in which sweetening agent such as sucrose, fructose, glucose, mannitol, solbitol, and/or flavoring agents such as cherry, fruit, orange, mint, may be added.

The suppository is suitable for rectal administration. As a substrate, cacao butter, for example, may be used.

When the composition is to be used for parenteral administration, they must be sterile, and used in the form of ampoules or vials with sterile injectable liquid pharmaceutical carrier or diluent such as sterile injectable water and physiological saline.

The present composition may be used in association with the known biochemical antidotes such as methionine, cysteine and glutathione, as well as with vitamins such as vitamin B group and vitamin C.

In case of treating human beings, the average daily dose is in general between 20 and 1,000 mg, preferably between 50 and 500 mg.

The results of toxicological and pharmacological tests on sodium salt of uridine-5'-diphosphate-glucuronic acid (sodium salt of UDPGA) are as follows:

(I) Acute toxicity

A solution of sodium salt of UDPGA in sterile distilled water was administered orally, intraveneously and intraperitoneally to ICR-mice, each having an average weight of 30 g.

The results obtained are shown in Table I below.

Table I

| Route of Administration | Average Lethal Dose (LD50) mg/kg |
|---|---|
| P. O. | 16,877 |
| I. V. | 6,413 |
| I. P. | 3,856 |

Note:
P.O. = oral administration
I.V. = intravenous administration
I.P. = intraperitoneal administration (II) Effects on glucuronide formation in liver Wistar-albino rats each having an average weight of 150 g were used as test animals.

Glucuronide formation in liver was determined by using O-aminophenol as substrate.

(Experimental 1)

10 mg/kg of sodium salt of UDPGA, dissolved in 0.5 ml of physiological saline, were then intraperitoneally administered to the rats one time a dag. After 3 days, rats were killed by decapitation, from which O-aminophenyl glucuronide formation was determined by using liver slice preparation.

This experiment were carried out after the administration of physiological saline and had been proved to have no effect on the glucuronide formation in liver.

The results are shown in Table II assuming that glucuronide formation in physiological saline-administered rate is "100".

Table II

| Compound | Glucuronide Formation |
| --- | --- |
| NaCl | 100.0 |
| Na salt of UDPGA | 176.5 |

(Experiment 2)

The relationship between the dosage of UDPGA-Na and the accelerating acetion for O-aminophenyl glucuronide formation was investigated.

The experimental method was the same as that in Experiment 1. The results are shown in Table III below.

Table III

| Dosage (mg/kg) | Glucuronide Formation |
| --- | --- |
| Control (NaCl) | 100.0 |
| 1 | 166.5 |
| 5 | 170.4 |
| 10 | 177.8 |
| 15 | 179.7 |

As is clear from Tables I, II and III, sodium salt of uridine-5'-diphosphate-glucuronic acid exhibits very low toxicity and potent accelerating action for glucuronide formation in liver.

The dosage forms of the present invention are shown in the following examples.

EXAMPLE 1 (VIALS)

200 mg of sodium salt of UDPGA, pyrogen-free, were dissolved in 2 ml of distilled water for injection into a vial, and lyophilized in vaccuo.

EXAMPLE 2 (Ampoules)

200 mg of sodium salt of UDPGA, pyrogen-free, were dissolved in 2 ml of distilled water for injection, filled into an ampoule, and sterilized.

EXAMPLE 3 (Tablets)

| Sodium salt of UDPGA | 100(mg) |
| --- | --- |
| Lactose | 90 |
| Starch | 50 |
| Talc | 8 |
| Magnesium stearate | 2 |

The above components were uniformly mixed, and formed into a tablet having a diameter of 8.0 mm.

EXAMPLE 4 (Powder)

| Sodium salt of UDPGA | 20(g) |
| --- | --- |
| Calcium phosphate, dibasic | 50 |
| Lactose | 30 |

The above components were uniformly mixed and prepared as powder.

EXAMPLE 5 (Capsules)

| Sodium salt of UDPGA | 100(mg) |
| --- | --- |
| Methionine | 100 |
| Thiamine hydrochloride | 10 |
| Calcium phosphate, dibasic | 100 |
| Talc | 10 |

The above ingredients were uniformly mixed and filled into a capsule.

EXAMPLE 6 (Tablets)

| Sodium salt of UDPGA | 100(mg) |
| --- | --- |
| Thiamine hydrochloride | 2 |
| Ascorbic acid | 10 |
| Lactose | 155 |
| Starch | 30 |
| Magnesium stearate | 3 |

The above components were made up into a tablet having a diameter of 10.0 mm.

What is claimed is:

1. A pharmaceutical composition as an accelerator for glucuronide formation in a dosage unit form selected from the group consisting of powder, tablets, pills capsules, dragees and aqueous solutions comprising uridine-5'-diphosphate glucuronic acid or its sodium salt as an active ingredient and a pharmaceutical carrier.

2. A pharmaceutical composition according to claim 1, wherein each dosage unit contains from 50 mg to 500 mg of uridine-5'-diphosphate-glucuronic acid as its sodium salt.

3. A pharmaceutical composition according to claim 1 wherein each dosage unit contains from 20 mg. to 1,000 mg. of uridine-5'-diphosphate-glucuronic acid as its sodium salt.

4. A pharmaceutical carrier according to claim 1 wherein the carrier is lactose, starch, calcium phosphate, talc, magnesium stearate, polyvinyl pyrrolidone carboxymethyl cellulose or gelatine.

5. A method of treating human beings for ailments requiring treatment to increase the glucuronide forming ability which comprises administering to such patient the composition of claim 1.

6. A method of treating human beings for ailments requiring treatment to increase the glucuronide forming ability which comprises administering to such patient the composition of claim 2.

7. A method of treating human beings for ailments requiring treatment to increase the glucuronide forming ability which comprises administering to such patient the composition of claim 3.

8. A method of treating human beings for ailments requiring treatment to increase the glucuronide forming ability which comprises administering to such patient the composition of claim 4.

* * * * *